5 Sheets—Sheet 1.

W. H. BEEHLER.

INSTRUMENT FOR TAKING NAUTICAL OBSERVATIONS.

No. 11,475. Reissued Feb. 26, 1895.

Witnesses
Roy C. Bowen.
Maurice J. Sousa.

Inventor
William H. Beehler,
By Whitman & Wilkinson,
Attorneys.

W. H. BEEHLER. 5 Sheets—Sheet 2.

INSTRUMENT FOR TAKING NAUTICAL OBSERVATIONS.

No. 11,475. Reissued Feb. 26, 1895.

Witnesses:

L. W. Selley.

Maurice J. Gousse.

Inventor.

William H. Beehler, by Whitman & Wilkinson

Attorneys.

5 Sheets—Sheet 3.

W. H. BEEHLER.

INSTRUMENT FOR TAKING NAUTICAL OBSERVATIONS.

No. 11,475. Reissued Feb. 26, 1895.

Witnesses:

L. W. Willig

Maurice J. Gainsa

Inventor.

William H. Beehler, by Whitman & Wilkinson

Attorneys.

W. H. BEEHLER.

INSTRUMENT FOR TAKING NAUTICAL OBSERVATIONS.

No. 11,475. Reissued Feb. 26, 1895.

Witnesses

Percy C. Bowen.

Maurice J. Jéroussa.

Inventor

William H. Beehler, by Whitman & Wilkinson,

Attorneys.

W. H. BEEHLER.

INSTRUMENT FOR TAKING NAUTICAL OBSERVATIONS.

No. 11,475. Reissued Feb. 26, 1895.

Witnesses:

L. M. Gillis

Maurice J. Finnessa.

Inventor.

William H. Beehler by Whitman & Wilkinson,

Attorneys.

UNITED STATES PATENT OFFICE.

WILLIAM H. BEEHLER, OF THE UNITED STATES NAVY, ASSIGNOR TO THE BEEHLER SOLAROMETER COMPANY, OF BALTIMORE, MARYLAND.

INSTRUMENT FOR TAKING NAUTICAL OBSERVATIONS.

SPECIFICATION forming part of Reissued Letters Patent No. 11,475, dated February 26, 1895.

Original No. 464,261, dated December 1, 1891. Application for reissue filed November 15, 1894. Serial No. 528,932.

*To all whom it may concern:*

Be it known that I, WILLIAM H. BEEHLER, a citizen of the United States, residing in the city of Baltimore, State of Maryland, have invented an Improvement in Instruments for Taking Nautical Observations; and I hereby declare the following to be a full, clear, and exact description of the same.

My invention relates to an instrument for taking observations of celestial bodies, and solving problems in practical nautical astronomy without reference to the sea horizon.

It consists in certain features which will be more clearly explained by reference to the accompanying drawings, in which the same parts are indicated by the same letters throughout the several views.

Figure 1:
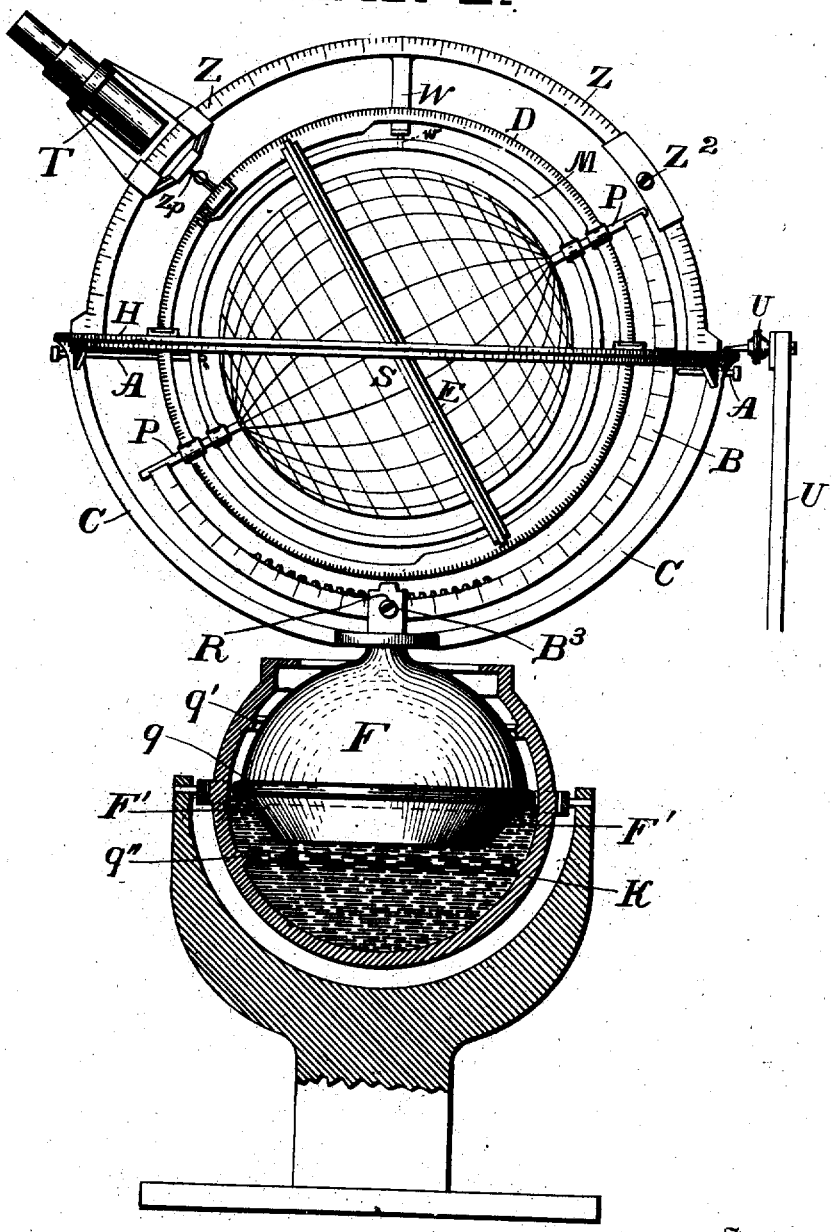
Figure 2:
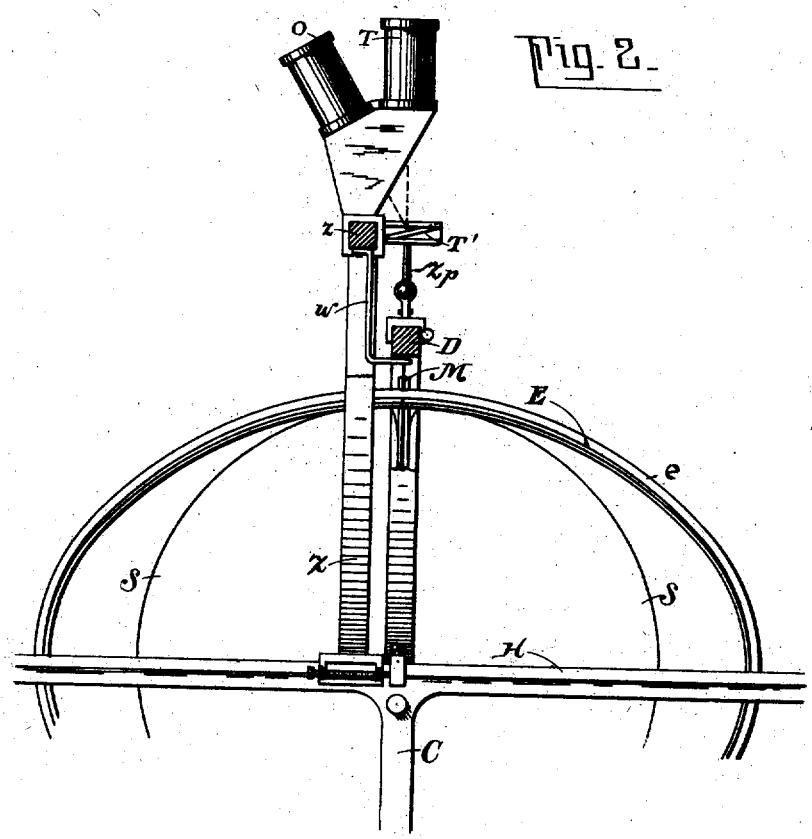
Figure 3:
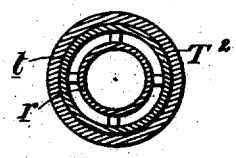
Figure 4:
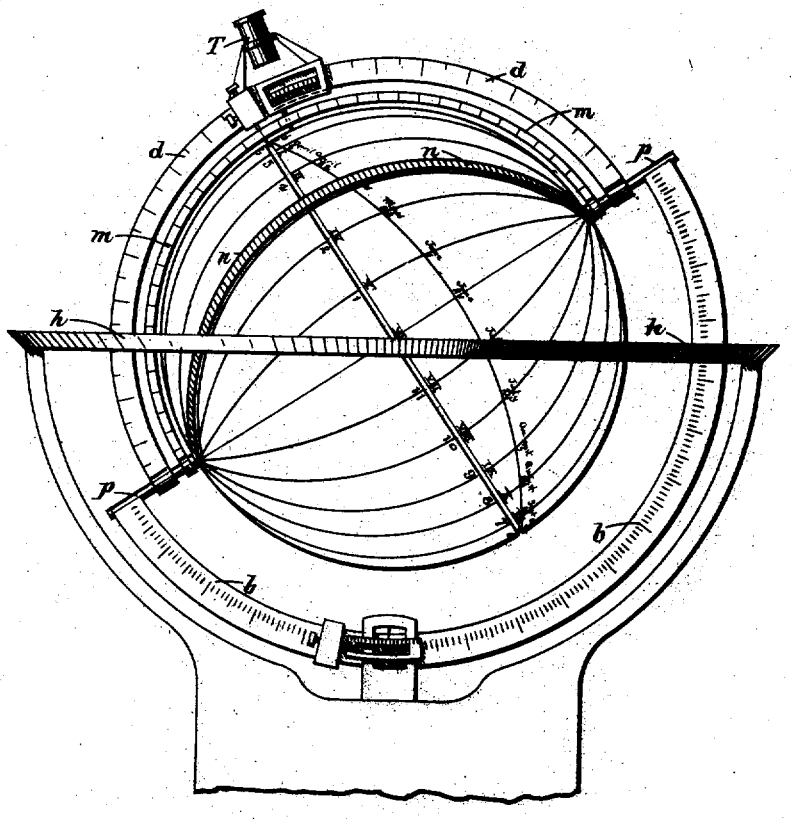
Figure 5:
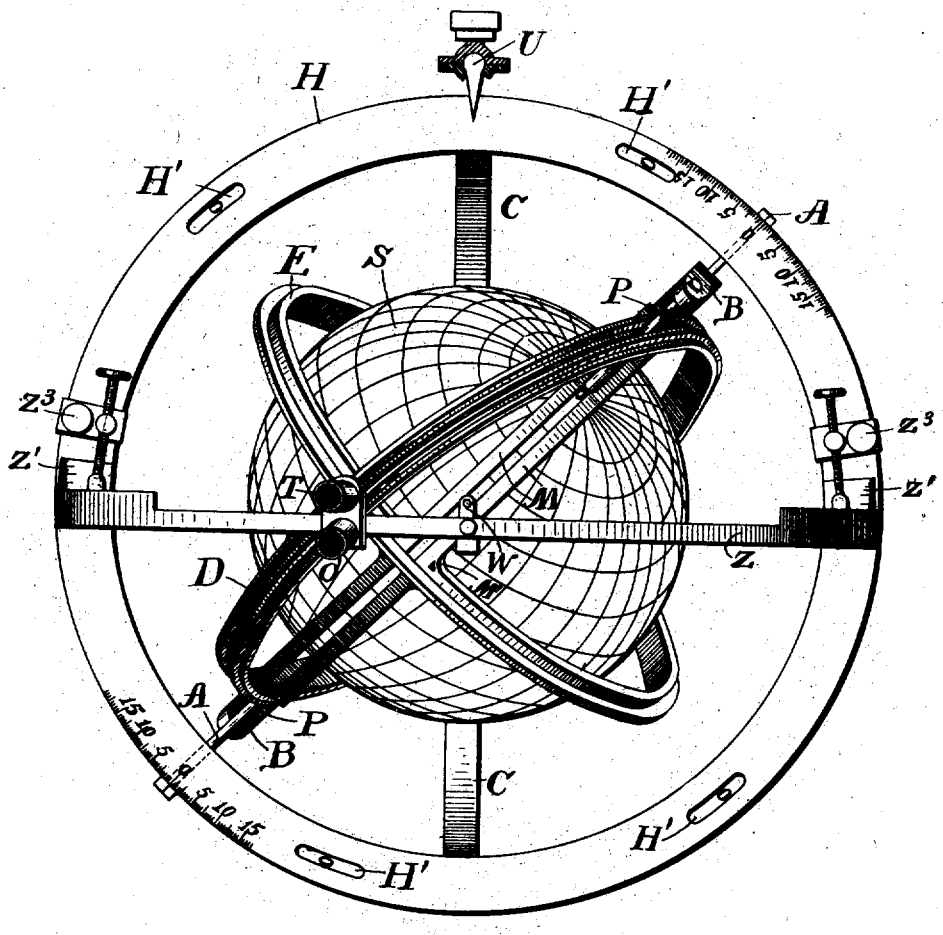
Figure 6:
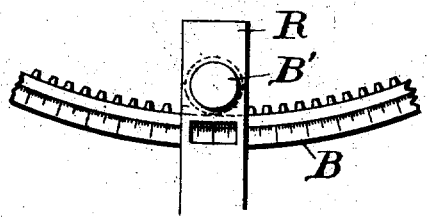
Figure 7:
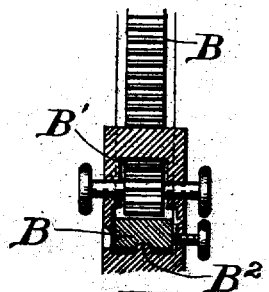
Figure 8:
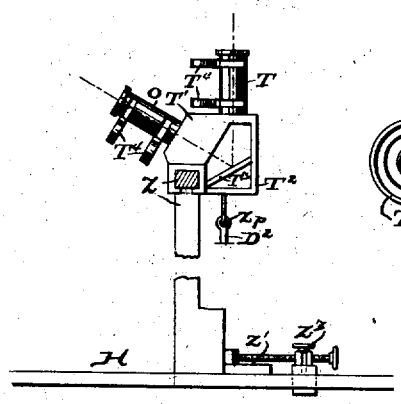
Figure 9:
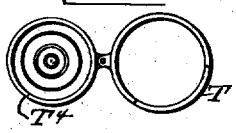
Figure 10:
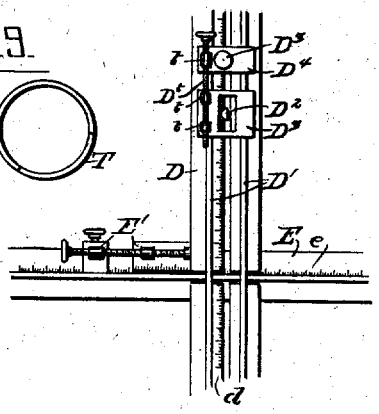
Figure 11:
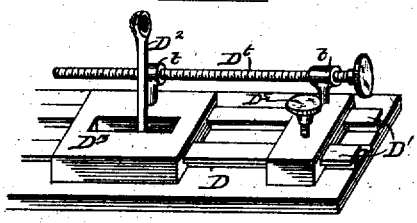
Figure 12:
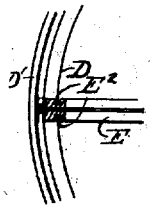
Figure 14:
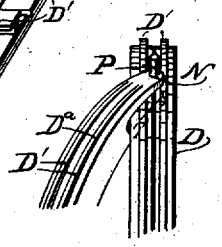
Figure 13:
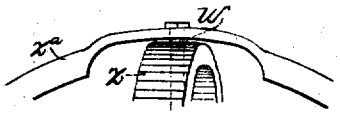

Figure 1 is a side elevation of my apparatus. Fig. 2 is a view taken at right angles with Fig. 1, and showing part of the artificial horizon, declination, and meridian rings. Fig. 3 is a cross-section of a telescope for observing the sun. Fig. 4 shows a modification of my device. Fig. 5 is a plan view of the apparatus. Fig. 6 is an enlarged side view of a section of the post R and the ring B, showing the operating devices. Fig. 7 is a transverse section of the same. Figs. 8 and 9 are enlarged details of the telescopes or observing-tubes and their connections. Figs. 10, 11, and 12 are enlarged details of the equatorial and declination rings at their points of junction, showing also the verniers. Figs. 13 and 14 are enlarged details of the supplemental azimuth and declination rings.

The instrument is called a solarometer, meaning an instrument to measure with the sun, though it is used for observations of the sun and stars. Ordinarily when stars are observed the position of the star is referred to that of the sun and the observer's position determined by comparing the hour angle as observed by the instrument with the mean time indicated by the chronometer regulated to Greenwich mean time.

The said instrument consists essentially of a plurality of angularly adjustable concentric rings mounted upon a floating base piece and hence kept at a constant level.

H is a graduated ring supported upon the brackets C which have their lower ends attached to and supported by the rod or post R carried by the float F′. This ring H is placed at right angles to the vertical axis of the float and is hence supported so that it is constantly evel and is therefore an artificial horizon, and the center of this ring is in the prolongation of the axis of the rod R. This ring may be fitted with spirit-level bulbs H′, countersunk in its face to indicate any deviation from the true level but these are not necessary, and serve only as a check on the leveling of the instrument. The rod R projects vertically upward from a float F′, which is supported in mercury contained in a bowl K. This bowl is supported by gimbals upon the upper end of an upright post or pillar which is secured to the deck of the vessel, and by these means the motion of the vessel is prevented from communicating itself to the apparatus, which is supported upon the deck. The bowl K is ordinarily made spherical to a point about two-thirds of its diameter, the upper one-third being cut away to form an opening or mouth whose edges terminate in a short vertical cylindrical extension with a flat rim or lip. The float is ordinarily hemispherical in the upper portion and has a flat circular bottom with re-entering curved edges, and, with its superincumbent weight, its displacement of mercury is such that when the bowl is level the flat surface of the bottom of the float lies below the horizontal central plane of the hemisphere and parallel therewith. Rings $q$ upon the outer surface of the float and $q'$ and $q^2$ upon the inner surface of the bowl arranged above and below the center, limit the inclination of the float with respect to the horizontal central plane of the bowl. These rings, together with the short cylindrical extension at the mouth of the bowl, constitute a fermeture to keep the mercury in the bowl in case of extraordinary violent heeling of the ship. If this should occur to such an extent as to bring these rings into contact, no reliable observation could be taken with the apparatus, because it would not be perfectly level. The greater portion of the heeling effects caused by the motion of the ship is annulled by having the apparatus secured amidships and by the gimbal-supports of the spherical bowl. The mobility of the mercury insures an accurate level flotation for the flat surface of the bottom of the float. The axis of the rod or post R is fixed in an exact vertical line above the float, and the lower ends of the arms C are rigidly attached to the upper end of the rod, as shown in Fig. 1.

B is a flat vertical ring, which forms a polar bracket. It is a semicircle, having bearing-surfaces at its ends one hundred and eighty degrees apart to support the polar axis P P of the instrument. This semicircular flat ring B has the center of its curvature in the exact vertical line of the prolongation of the axis of the rod R. This center is also the common center of the entire system of dependent rings. This ring B is graduated into degrees and fractions from zero to ninety degrees upon each side, as shown in Figs. 1 and 6. It fits into a slot in the top of the rod R and has its interior curved edge formed into ratchet-teeth, which are engaged by a pinion B′, as shown in Figs. 6 and 7. This pinion is mounted upon a shaft extending through the slotted upper end of the rod R and having disks $B^{\circ}$ upon the outer ends, so that by turning these disks and shaft, the pinion which engages the ratchet-teeth, will act to move the ring B in one direction or the other within the slot, and thus either pole of the sphere may be elevated while the other is correspondingly depressed. The lower outer edge of the ring B has a slot made in it which forms a keyway or guide for a rib which projects upwardly from the bottom of the slot in the rod R, as shown at $B^2$, Fig. 7. Near the extremities of the ring B, this slot is cut entirely through the ring, and the pins A and A′ which extend under the horizon-ring H, as shown in Fig. 1, have their ends entering into this open slot. By this construction the ring B is held so that the axis of the poles P lies in a plane passing through the zero-points of the graduated horizon-ring H. A set-screw $B^3$ fits into the side of the rod R, and by this means the ring B may be clamped in any position to which it has been moved by aid of the thumb-screws and pinion B′, as before described.

S is a sphere of any suitable light material, having upon its surface a graphical representation of the fixed stars and the different constellations. It may have also meridian-lines, equator, and parallels and the ecliptic also may be marked upon its surface. This sphere is supported to revolve with the polar axis having bearings at each end in the polar bracket, as shown at P. This sphere performs, however, only the functions of a star chart or a stellar globe, and in no way affects the operation of the instrument. It may be omitted altogether if desired.

M M is a ring, which is a narrow segment of a sphere concentric with the various rings. It is supported upon the polar axis P P and is free to revolve thereon. This ring is called the meridian-ring, and may be swung through any angle about the polar axis P P. It has a longitudinal slot in the center of its outer surface, and one of the pins A which project beneath the horizon-ring H and engage the slot in the polar bracket B, also enters the slot in the ring M. The pin *w* at the lower end of the bent arm W, depending from the azimuth circle Z, to be hereinafter described, also enters the slot in the ring M, and these pins serve to confine the meridian-ring M in such a position that the vertical plane of the center of its longitudinal slot occupies the position of the observer's local meridian when the instrument is in the proper position for taking observations. The slot in the meridian-ring and that in the outer ends of the polar bracket B are in the same plane. The slot in the polar bracket is cut through at sixty-five degrees from each pole to enable the pins A to pass through it and into the slot in the meridian-ring when the pole is elevated.

In practice it will not be necessary, as a rule, to use the instrument in latitudes above sixty-five degrees north or south, and this is the reason for limiting the slot to that distance. When the observer is in zero latitude, or when the polar axis lies in the plane of the horizon-ring H, the pin A′ will pass through the slot in the bracket B near the polar axis; but as the pin is below the ring H the thickness of this ring carries the pin sufficiently below the polar axis to prevent its interfering with it in that direction.

E is the equatorial ring. This is also a narrow segment of a sphere concentric with the various rings and is of slightly greater diameter than the meridian-ring M. This ring E is rigidly attached to the meridian-ring at right-angles to it. Braces M′ connect the two circles and serve to rigidly support the equatorial ring in a plane at right angles to that of the meridian-ring M, as shown plainly in Fig. 5. The outer surface of the ring E has a knife-edge rib *e* which projects beyond it. This knife-edge occupies the exact plane of the great circle perpendicular to the plane of a great circle passing through the poles P P. The outer surface of the equatorial ring E is graduated into twenty-four hours, and the hours into minutes, and seconds of time, with the zero and twelve-hour marks at its point of intersection with the meridian-ring M. On opposite sides of the equatorial ring E are grooves $E^2$ for bearing-surfaces for the declination-ring D, (shown plainly in Fig. 12.)

The declination-ring D is a narrow segment of a concentric sphere, and of the same diameter as the edge of the rib upon the equatorial ring before described. This declination-ring is supported upon the polar axis P, around which it is free to revolve over the surface of the sphere and over the meridian-ring M. Its middle portion, at ninety degrees from the pole, is cut and formed to fit into the grooves E′ in the opposite surfaces of the equatorial ring, and elevated T rails or ribs D′ projecting above its surface connect the two parts of the ring at these points where it is cut, as will be hereinafter more fully described.

The middle longitudinal line on the ring D is marked by a slot *d* along which the declination arc is graduated into degrees, minutes, and seconds, from zero at its intersection with the equatorial ring E to ninety degrees at the poles. The ribs or rails D′ are upon each side of this slot, and extend continuously from pole to pole, connecting the two parts of the ring where separated by the projection of the knife-edge of the ring E, as before described. These ribs or rails serve to support the declination-vernier which is shown in Figs. 10 and 11. This vernier is fitted in a frame which travels on these rails D′. The graduations of the vernier arc on one side of the center line are opposite the graduations of the declination-ring under the frame and which show through.

At the initial point of the vernier there is a pin $D^2$, which is perpendicular to the tangent plane of the arc D at this point. This pin carries a ball-socket at its outer end, and this receives a ball dependent at the end of the pin $Z^p$, as shown in Figs. 1 and 2, which hangs down from the center of the mirror on the azimuth arc Z. The pin $Z^p$ and the pin $D^2$ and the axis of the telescope or object-tube T on the azimuth arc Z Z are in a straight line from the common center of the circles.

The vernier-block $D^3$ and the tangent-block $D^4$ have T-shaped grooves made in their lower surfaces to fit the T-rails D′, and a set-screw $D^s$ clamps the block $D^3$ to the surface of the declination arc D. The tangent-screw $D^t$ brings the vernier-block $D^3$ to any desired position by accurate coincidence with graduations of the declination arc D and those of the vernier-scale. The tangent screw $D^t$ is supported in movable joints upon upright posts *t*. These movable joints are screw threaded, forming nuts through which the screw turns, and by their movement the screw will act in the direction of a tangent, while the vernier-block moves over the curved surface of the declination arc, this being the general construction of verniers as fitted to sextants. At one side of the declination-ring D there is another vernier and vernier set-block E′, which works on the equatorial ring in a similar manner, as shown in Fig. 10. This marks the accurate adjustment of the declination arc D to the position where it is desired to clamp it or where it may be brought by its junction with the azimuth arc when observing a celestial body.

It will be understood that all of the verniers with set-blocks and set-screws and tangent-screws are arranged similarly to that above described to allow a movement of the parts while the screw acts in the direction of the tangent.

The azimuth and altitude ring Z is a narrow segment of a sphere of the same diameter as the ring H. It is supported vertically upon the ring H and is free to revolve about a vertical axis around a zenith-pin which is fixed to the zenith of the ring in the exact prolongation of the axis of the rod R and in the vertical line above the center of the system of rings. Shoulder-pieces Z′ extend horizontally from the feet or ends of the ring Z and fit upon the ring H. These feet of the ring Z are enlarged and slide over the flat surface of the ring H. On one foot is a vernier-scale with a tangent and set-screws, as shown at $Z^3$, by which the exact position of the imaginary vertical circle Z can be read by the graduations on the ring H. One edge of the ring Z is cut away or recessed, as shown in Figs. 5 and 8, so that the exact vertical circle through the zenith to the horizon will pass through this space to one side of the ring Z, as shown by the dotted lines in Fig. 5. Upon this azimuth arc Z is supported a sliding carriage T′, upon which are mounted two tubes or telescopes O and T. The axis of the telescope T is supported upon this sliding carriage in such a position that it is in a vertical plane passing through the common center of the circles. The carriage supports a box $T^2$ directly beneath the telescope T, and this box contains a mirror $T^3$, fixed at an angle with the plane of the tangent of the arc Z in such a manner that the surface of the mirror makes equal angles with the axis of the telescopes T and O.

Attached to the box $T^2$ and directly in prolongation of the axis of the telescope T is the dependent pin $Z^p$, having the ball-joint which connects it with the pin $D^2$, as previously described.

When the telescope T is turned toward a celestial body the image of that body is reflected by the mirror $T^3$ and will be seen in the axis of the tube O. The exact point on the mirror $T^3$ where the axis of the telescope meets the mirror is marked by the intersection of cross-lines on the mirror. The lenses in the telescopes T and O focus the image of the body observed on the mirror.

In order to obviate the loss of light, to dispense with lenses, and to secure an observation of the center of the sun, moon, or other body and bring it accurately to the center of the observing-tube, I substitute for the telescopes T and O two tubes, which are provided with sliding leaves or shutters having central holes, so that by the use of any of these shutters the aperture may be reduced to as small a diameter as may be necessary for the purpose. These sliding leaves or shutters are plainly shown in Figs. 8 and 9 at $T^4$. They are hinged on one side, so that they may turn into or out of slots made in the side of the tube. When turned in to the full extent, the center of the leaf occupies the exact line of the axis of its tube. The center aperture of the sliding leaf is provided with two cross-hairs, made of fine platinum wire. These wires intersect or join a central circle of preferably about one millimeter in diameter, outside measurement.

The wire is also joined to a second concentric ring, as shown in Fig. 9. The four sliding leaves fit in slots near the ends of the tubes T and O, one in each end of each of the tubes. The mirror is plain, without any marks, and the reflection is such that when all four of the sliding leaves are pushed into the tubes the cross-wires and rings all coincide with the shadow reflected from the mirror. If the sun be observed, its disk will appear to occupy almost the entire aperture. When the axis of the tube is in the exact direction of the center of the sun, the sun's disk will appear to be symmetrical with that of the shadow caused by the outer platinum-wire ring. If the moon be observed, its center will be in the axis of the tube T, when the curvature of the visible disk is seen to coincide symmetrically with that of the outer wire ring of the sliding leaf. If a star be observed, it will be in the direction of the axis of the tube, when the star appears to be exactly in a central inner wire ring. The shadows of the platinum wires enable observations to be taken of heavenly bodies when exactly in the direction of the axis of the tube—that is, in a line to the center of the system—or practically as if observed at the center of the earth.

In making observations of stars the sliding leaves are pushed out, so that the entire aperture of the tubes will be clear to find the star with facility. When the azimuth arc is turned so near that the heavenly body is seen in the tube, it becomes necessary to make further adjustment to bring the body in the axis of the tubes. The sliding leaves $T^4$ are then pushed into the tubes and the several arcs D, E, Z, and B are turned by their tangent-screws until the body observed appears exactly in the axis of the tubes. These tubes will only be in that position for about one second of time, and it is necessary to turn the tangent-screws on E and Z accordingly to get the exact instant when the star or the center of the sun or moon is in the axis of the tubes. That instant is noted by the chronometer or watch regulated to Greenwich apparent time. The difference between this apparent time and the local hour-angle read off on the equatorial ring between the arcs D and M gives the longitude. In case of observations of the sun the hour-angle is local apparent time.

If observing a star, planet, or the moon, the local apparent time is obtained by reducing the hour-angle of the body, as observed, to that of the sun by applying the algebraic difference of the right ascensions of the sun and body observed, as given in the *Nautical Almanac*. There is no difficulty in making final adjustment with the tangent-screws on the arcs E, Z, and B. Since the declination of heavenly bodies changes very slowly, it does not require much manipulation to bring the body in position above or behind the center of the cross-wires. One or two turns of the ratchet-pinion B′ moves the arc B so as to bring the tubes to the necessary elevation, which does not change in the few moments of time necessary to take observation. The tangent-screw of D on E is the only one necessary to follow the body except it be a body which changes its azimuth very rapidly, when it is also necessary to move the tangent-screws of Z on the ring H.

In order to automatically make allowance for the effect of the refraction of the atmosphere, the curvature of the ring or arc Z is not strictly that of a segment of a sphere, but differs slightly in the shape of its outer surface.

The refraction of light is greatest when the heavenly body is at a low altitude. When in the zenith, the effect of refraction is nothing. The tube or telescope on the arc Z is therefore caused to move over an arc whose curvature changes by the amount of refraction, this curvature being produced by making the outer surface of the arc Z the curve of a circle with a constantly-changing center. This arc is constructed in accordance with the known amount of refraction which has already been calculated and compensates this refraction so that the true altitude of the body is indicated instead of its apparent altitude. I have calculated this compensation for an atmosphere at a temperature of 60° Fahrenheit and barometer thirty inches. At greater or less temperature and at different pressures there are varying effects of refraction, but this variation under abnormal conditions is chiefly at low altitudes. These low altitudes are to be avoided, not only on account of refraction, but chiefly because the instrument is located on board the ship low down, so that the rail will often render it impracticable to observe heavenly bodies at low altitudes.

$Z^2$ is an adjustable weight movable upon the azimuth-ring and fixed thereto at a point on the opposite side of the zenith-line from the telescope-carriage, so as to counterbalance the latter and maintain the horizon-ring at an exact level.

When the instrument is used for finding Greenwich mean time from lunar distances, an additional declination-ring and azimuth-ring are employed. These rings are fitted in all respects like the declination-ring D and azimuth-ring Z, with mirror, telescope, observing-tube and other parts, as hereinbefore described. The arc $Z^a$ is in all respects similar to the azimuth arc Z except that it is of greater diameter near the zenith, where it is enlarged to fit over the arc Z, as shown in Fig. 13. The bent arm W on the arc Z, which carries the pin in the exact plane of the azimuth, is provided with an extra piece, which carries an arm over the top of the arc Z and which fits into a slot in the highest point of the arc $Z^a$. This arc $Z^a$ rests upon the horizon-ring and has a vernier with set and tangent screws in all respects like the azimuth arc Z. The adjustable declination arc $D^a$ is fitted with forked ends to fit onto the polar axis P on each side of the bearings of the permanent declination-ring D, as shown in Fig. 14. It is of the same diameter as the ring D, except at its ends and it is only one hundred and eighty degrees in length from pole to pole. It has a central slot with graduations and a vernier-scale with pin-and-ball socket N to receive the dependent pin $Z^p$ from the arc $Z^a$.

When adjusted, the arcs $Z^a$ and $D^a$ are employed for observations of the heavenly body exactly like those of Z and D, of which they are practically duplicates in essential features. They afford means by which two observers may simultaneously take observations of two heavenly bodies visible in the heavens at the same time and not too remote from each other. Such observation indicates the lunar distance, which is measured on a graduated metal tape-line.

The distance between the verniers at the initial points on D and $D^a$, measured on this graduated line, is the angular apparent lunar distance between the two bodies, the moon being observed on the arc Z and the sun or star at the same time on the arc $Z^a$.

The *Nautical Almanac* gives the lunar distance of heavenly bodies, and by comparing the lunar distance observed with that of the almanac the exact Greenwich time is obtained at the instant of observation. If the instant of observation is noted by a chronometer, the error of that chronometer in the Greenwich time is the difference between the time shown by the chronometer and the exact Greenwich time, and is thus ascertained from the lunar distance. The local time is found from either or both of the hour-angles made by either D or $D^a$ with the meridian-ring N. If both hour-angles give the same result, it is a check upon the accuracy of the observation.

In taking an observation of a lunar distance it must be done with the moon at such a distance from the other celestial body that either one or the other is at some distance from the zenith, so that the sliding carriages on the two azimuth arcs will not be so close together as to interfere with each other.

An upright standard is fixed in front of the solarometer in line with the keel and has an index U hinged to it, so as to rest slightly upon the edge of the horizon-ring H, and this will indicate the exact direction of the vessel's head at the instant of any observation, from which the compass error may be obtained.

Having thus described my invention, what I claim as new, and desire to secure by Letters Patent, is—

1. In an apparatus of the character described, the combination with a bowl suspended from gimbals and partly filled with a heavy liquid, a float floating in the liquid in said bowl, a vertical column carried by said float, and apparatus for taking observations carried by said column, substantially as described.

2. In an apparatus of the character described, the combination with a bowl suspended from gimbals and partly filled with a heavy liquid, of a float floating in the liquid in said bowl, a vertical column carried by said float a horizontal circle carried by said column, and a pointer adapted to indicate the bearing of the ship's head relative to said horizon circle, substantially as described.

3. The combination with a vessel containing liquid, of a movable float therein, a graduated circle attached to and carried by said float parallel to the surface of said liquid, and means for ascertaining the bearing of any given diameter of said circle, substantially as described.

4. The combination with a vessel containing liquid, of a movable float therein, a graduated circle attached to and carried by said float parallel to the surface of said liquid, and a pointer secured in a fixed direction for indicating the bearing of any given diameter of said circle, substantially as described.

5. In an apparatus of the character described, the combination with a vertical column and means for keeping the axis of the same in a vertical position, of the telescope carrying arc supported on said column, the telescope adapted to slide along said arc, the mirror, and object glass moving with said telescope, and a plurality of circles concentric with each other for indicating the latitude, declination, and hour-angle, substantially as described.

6. In an apparatus of the character described, the combination with a float and a vertical column carried thereby, of a telescope carrying arc pivotally mounted on said column the telescope, mirror, and object glass secured together and adapted to be moved along, said telescope carrying arc; a declination circle and a movable connection between said telescope and said declination circle, and an equatorial circle, meridian circle and polar bracket concentric with said declination circle and mounted on said column, substantially as described.

7. An apparatus for taking nautical observations comprising a bracket, graduated rings or circles, concentric with each other and carried by said bracket, a floating base or support and a mirror mounted upon one of said circles, and interrupting the line of sight to the center thereof, whereby an observation of celestial bodies is taken as if from the exact center of the earth, substantially as described.

8. An apparatus for taking nautical observations comprising concentric graduated rings, and spherical segments having a common center therewith, a liquid containing bowl with gimbals upon which it is supported, and a float supported in the liquid and upon which the segments, and circles are adjustably supported, whereby observations at sea may be taken independent of the visibility of the sea-horizon, substantially as described.

9. In an apparatus of the character described, the combination of concentric rings in segments of concentric spheres of different diameters adjustably connected together, the declination-ring, and an equatorial concentric ring upon which the declination-ring is adapted to move or revolve, relative to each other, and a floating base supporting said rings, substantially as described.

10. An apparatus for taking nautical observations comprising a bowl containing mercury, a float resting in said mercury and forming a constantly-level base, a post or support extending upwardly from said float, a bracket carried thereon, a horizon circle supported upon said bracket, an adjustable polar bracket, and the meridian azimuth, and altitude rings arranged concentric with each other and mounted upon said float, substantially as described.

11. An apparatus for taking nautical observations comprising the suspended bowl containing mercury and the float resting therein, the adjustable polar bracket, the horizon, meridian, and declination rings and the azimuth-ring the curvature of which varies from that of a circle, so that as the sliding carriage of the telescope-mount is moved upon the azimuth-ring the axis of the telescope will be adjusted to correct for the refraction of the atmosphere, substantially as described.

12. An apparatus of the character described comprising the suspended bowl and float, the adjustable polar bracket, the azimuth-ring, a sliding carriage moving thereon and carrying a telescope, in combination with an inner tube having the same axis with the telescope, and the concentric band adapted to throw shadows of concentric circles upon the mirror when a celestial body is observed having a visible diameter and for the purpose of adjusting the telescope to the exact center of said body, substantially as described.

13. In an apparatus of the character described the combination with the suspended bowl and float, the horizon-ring supported therefrom, of the adjustable polar bracket, the azimuth circle, with the movable carriage, telescope, and observing-tube and mirror supported at the junction of the axis of the observing-tube and telescope, the declination-ring having a vernier-scale, and a flexible connection beneath the mirror in the vertical plane, through the common center of the circles, substantially as described.

14. An apparatus for taking nautical observations comprising a bowl suspended upon gimbals and containing mercury, a float adapted to rest in the mercury in said bowl, a polar bracket supported by and adjustable from said float, horizon and meridian circles, and an azimuth-ring, arranged concentric with each other, a mirror, a sliding carriage adjustable upon the azimuth-ring, a telescope mounted upon said carriage, and an observing-tube mounted upon the same carriage and with such relation to the telescope as to cause the lines of the axes of the telescope and observing-tube to meet the surface of the mirror at equal angles, substantially as described.

15. The graduated rings and circles, and a horizontal ring supported upon a float so as to form a constant level base, in combination with the hinged index-hand attached to a vertical support in the vertical plane of the keel of a vessel, and in front of said apparatus, whereby the bearing of the ship's head may be indicated by the graduations upon the horizon-ring of the apparatus at the instant of any observation, substantially as described.

In testimony whereof I have hereunto affixed my signature in the presence of two subscribing witnesses.

WILLIAM H. BEEHLER.

Witnesses:

JOHN CHALMERS WILSON,
MAURICE J. SIOUSSA.